(12) United States Patent
Tomiyama et al.

(10) Patent No.: US 11,846,309 B2
(45) Date of Patent: Dec. 19, 2023

(54) GROMMET FOR ATTACHING COVER AND COVER

(71) Applicant: Sumitomo Riko Company Limited, Aichi (JP)

(72) Inventors: Koji Tomiyama, Aichi (JP); Koichiro Iwanaga, Aichi (JP); Takuya Tokunaga, Aichi (JP); Ryosuke Kutsuna, Aichi (JP); Junichiro Suzuki, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 387 days.

(21) Appl. No.: 17/197,063

(22) Filed: Mar. 10, 2021

(65) Prior Publication Data

US 2021/0190114 A1    Jun. 24, 2021

Related U.S. Application Data

(63) Continuation of application No. PCT/JP2019/035944, filed on Sep. 12, 2019.

(30) Foreign Application Priority Data

Sep. 20, 2018  (JP) ................................ 2018-176435

(51) Int. Cl.
*F16B 19/00* (2006.01)
*F02B 77/13* (2006.01)
(Continued)

(52) U.S. Cl.
CPC ............ *F16B 19/008* (2013.01); *F02B 77/13* (2013.01); *F16B 5/06* (2013.01); *F16B 5/126* (2013.01);
(Continued)

(58) Field of Classification Search
CPC .. F16B 21/073; F16B 5/0664; F16C 11/0657; F16C 2226/74; B60R 13/0206
See application file for complete search history.

(56) References Cited

U.S. PATENT DOCUMENTS 3,916,756 A * 11/1975 Yoda ..................... F16B 21/075
24/683
5,163,773 A * 11/1992 Denney ................. F16C 11/069
403/140
(Continued)

FOREIGN PATENT DOCUMENTS

DE    102007041537 A1 *  3/2009  ............ F16B 21/075
DE    102011056748 A1 *  6/2013  ......... B60R 13/0206
(Continued)

OTHER PUBLICATIONS

DE-102007041537-A1 Machine Translation (Year: 2009).*
(Continued)

*Primary Examiner* — Michael W Hotchkiss
(74) *Attorney, Agent, or Firm* — JCIPRNET

(57) ABSTRACT

The concave part includes an open end portion having an inner diameter greater than an outer diameter of a tip end portion of a ball stud, a fitting portion which is connected to the open end portion and has an inlet smaller than the outer diameter of the tip end portion and in which the tip end portion is housed, and a plurality of slits which are formed in a fitting direction of the ball stud from the open end portion and arranged at a predetermined interval along the circumference of the concave part. The pull-out prevention part includes a plurality of first ribs located on extensions of the respective slits.

9 Claims, 6 Drawing Sheets

(51) Int. Cl.
   *F16B 5/06* (2006.01)
   *F16B 5/12* (2006.01)
   *F16B 21/07* (2006.01)
   *B60R 13/02* (2006.01)

(52) U.S. Cl.
   CPC ......... *B60R 13/0206* (2013.01); *F16B 5/0664* (2013.01); *F16B 21/073* (2013.01)

(56) References Cited

U.S. PATENT DOCUMENTS

| | | | | |
|---|---|---|---|---|
| 5,249,845 | A * | 10/1993 | Dubost | B60B 7/02 301/108.4 |
| 5,580,204 | A * | 12/1996 | Hultman | F16B 5/065 24/297 |
| 6,758,622 | B2 * | 7/2004 | Burton | F16C 11/0657 403/7 |
| 7,008,135 | B2 * | 3/2006 | Wisler | F16C 11/0623 403/143 |
| 7,963,715 | B2 * | 6/2011 | Burton | F16C 11/0657 403/135 |
| 8,322,001 | B2 * | 12/2012 | Ehrhardt | F16B 5/123 24/457 |
| 8,403,356 | B2 * | 3/2013 | Tago | B60R 21/026 24/297 |
| 8,720,016 | B2 * | 5/2014 | Beaulieu | F16B 21/073 24/457 |
| 8,776,326 | B2 * | 7/2014 | Clarke | F16B 21/186 24/297 |
| 9,097,272 | B2 * | 8/2015 | van Niekerk | F16B 21/04 |
| 9,382,928 | B2 * | 7/2016 | van Niekerk | F16B 2/20 |
| 9,458,868 | B2 * | 10/2016 | Metten | B29C 45/16 |
| 9,816,460 | B2 * | 11/2017 | Kondo | B29C 44/1261 |
| 9,995,243 | B2 * | 6/2018 | Kondo | F02B 77/13 |
| 10,167,890 | B2 * | 1/2019 | Steffenfauseweh | F16B 21/075 |
| 10,549,703 | B2 * | 2/2020 | Korber | F16B 2/22 |
| 10,746,217 | B2 * | 8/2020 | Fritzsch | F16B 21/073 |
| 10,851,827 | B2 * | 12/2020 | Bohl | F16B 41/00 |
| 11,209,033 | B2 * | 12/2021 | Spitzer | F16B 21/073 |
| 2005/0175398 | A1 * | 8/2005 | Contero | B60T 7/06 403/122 |
| 2005/0191119 | A1 * | 9/2005 | Aoshima | F16C 11/0604 403/122 |
| 2006/0073310 | A1 * | 4/2006 | Winkler | F02B 77/13 428/158 |
| 2008/0056816 | A1 * | 3/2008 | Sussenbach | F16B 5/065 403/348 |
| 2013/0236238 | A1 * | 9/2013 | Burton | F16C 11/06 403/135 |
| 2019/0368535 | A1 * | 12/2019 | Recker | F16C 11/0685 |
| 2020/0053482 | A1 | 2/2020 | Nakano et al. | |
| 2020/0149565 | A1 * | 5/2020 | Vorderwisch | F16B 5/065 |
| 2020/0213772 | A1 | 7/2020 | Hasegawa et al. | |
| 2020/0307992 | A1 | 10/2020 | Hasegawa et al. | |
| 2020/0386253 | A1 * | 12/2020 | Meyers | B60R 13/0206 |

FOREIGN PATENT DOCUMENTS

| | | |
|---|---|---|
| DE | 202018104667 U1 * | 10/2018 |
| JP | 2006336743 | 12/2006 |
| JP | 6073610 | 2/2017 |

OTHER PUBLICATIONS

DE-102011056748-A1 Machine Translation (Year: 2013).*
DE-202018104667-U1 Machine Translation (Year: 2018).*
"International Search Report (Form PCT/ISA/210)" of PCT/JP2019/035944, dated Oct. 15, 2019, with English translation thereof, pp. 1-6.

* cited by examiner

GROMMET FOR ATTACHING COVER AND COVER

CROSS-REFERENCE TO RELATED APPLICATION

The present application is a continuation of PCT/JP2019/035944, filed on Sep. 12, 2019, and is related to and claims priority from Japanese patent application no. 2018-176435, filed on Sep. 20, 2018. The entire contents of the aforementioned application are hereby incorporated by reference herein.

BACKGROUND

Technical Field

The present disclosure relates to a grommet for attaching a cover used to mount a soundproof cover on a body to be covered of an engine or the like of an automobile, and a cover using the grommet.

Related Art

For example, a soundproof engine cover is attached to an engine of an automobile. As disclosed in Patent Literature 1 (Japanese Patent No. 6073610) and Patent Literature 2 (Japanese Patent Application Laid-Open No. 2006-336743), an engine cover holds an attachment member or a grommet opening downward and formed of rubber in a plurality of receiving sections protruding from a back surface. The engine cover is mounted by pushing the attachment member or the grommet against an attachment pin such as a ball stud or the like protruding from the surface of the engine. In particular, while the attachment member is formed integrally with the engine cover in Patent Literature 1 and the grommet is fitted into the receiving section, which is a separate body, in Patent Literature 2, a slit is formed in the grommet, and reduction in a load when the attachment pin is pushed thereinto is achieved.

When the grommet is formed of rubber while the cover is formed of a urethane having a high soundproofing property, since an adhesive property between the urethane and the rubber is poor, adhesion processing of a primer or the like is required, which increases man-hours and leads to an increase in cost. When the grommet is formed of a urethane and a resin having an adhesive property, while the adhesion processing is not required and it leads to a reduction in weight, since a resin product is not compressively deformed like the rubber, a large amount of force is required to fit or remove the attachment pin, which may deteriorate workability for attachment/detachment and may damage the grommet due to excessive pushing or pulling upon attachment and detachment.

SUMMARY

Here, the present disclosure provides a grommet for attaching a cover and a cover that are capable of accomplishing reductions in weight and cost by improving workability for attachment/detachment of the cover.

According to one embodiment of the disclosure, provided is a grommet for attaching a cover formed integrally with an attachment part protruding from a back surface of a cover main body and to which a tip end portion of an attachment pin provided on a body to be covered is fitted, the grommet for attaching a cover including: a concave part into which the tip end portion is fitted, and a pull-out prevention part buried in the attachment part and configured to prevent pulling out from the attachment part, wherein the concave part includes an open end portion having an inner diameter that is greater than an outer diameter of the tip end portion, a fitting portion connected to the open end portion and having an inlet with a diameter equal to or smaller than the outer diameter of the tip end portion and into which the tip end portion is fitted, and a plurality of slits formed in a fitting direction of the attachment pin from the open end portion and disposed at predetermined interval in a circumferential direction of the concave part, and the pull-out prevention part includes a plurality of first ribs disposed on extension lines of the slits.

According to another embodiment of the disclosure, provided is a cover including a cover main body, and a plurality of attachment parts protruding from a back surface of the cover main body to correspond to attachment pins provided on a body to be covered, wherein the grommet for attaching a cover of the above embodiments is formed integrally with each of the attachment parts.

DESCRIPTION OF EMBODIMENTS

Hereinafter, an embodiment of the present disclosure will be described with reference to the accompanying drawings.

Figure 1:
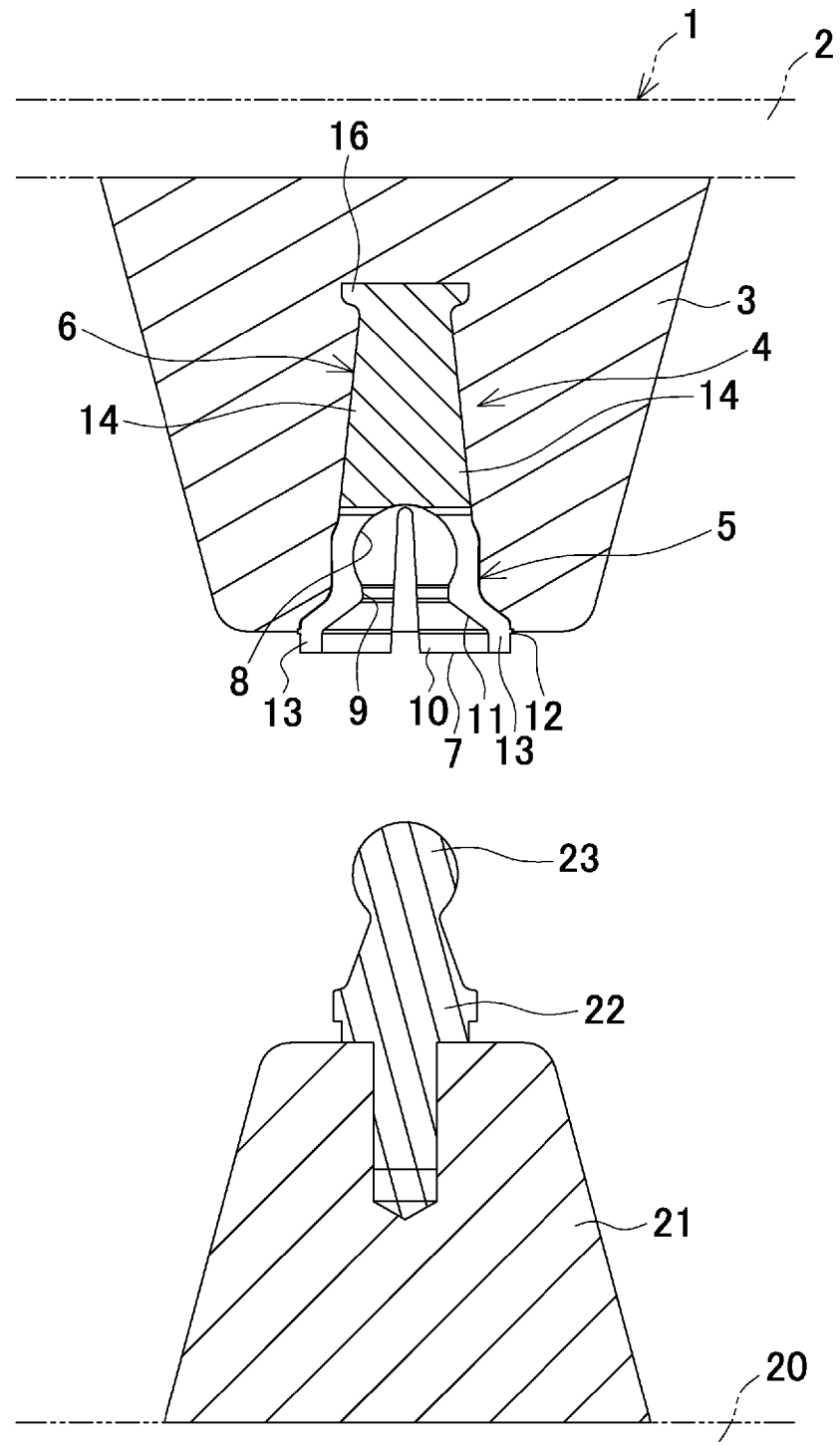
FIG. 1 is a view for describing a state in which an engine cover is mounted on an engine.

FIG. 1 is a view for describing a state in which an engine cover 1 that is an example of a cover is mounted on an engine 20 that is a body to be covered. First, a plurality of (only one is shown in FIG. 1) protrusions 21, 21 . . . for attachment of the engine cover 1 protrude from a surface of the engine 20, and a ball stud 22 serving as a metal attachment pin having a tip end portion 23 with a spherical shape protrudes from each of the protrusions 21.

Meanwhile, the engine cover 1 has a cover main body 2 formed of a urethane and configured to cover a surface of the engine 20 in a non-contact manner, a plurality of (only one is shown in FIG. 1) attachment parts 3, 3 . . . protruding downward from a back surface of the cover main body 2 to match positions of the ball studs 22, and a grommet for attaching a cover (hereinafter, simply referred to as "a grommet") 4 is held on each of the attachment parts 3.

Figure 2:
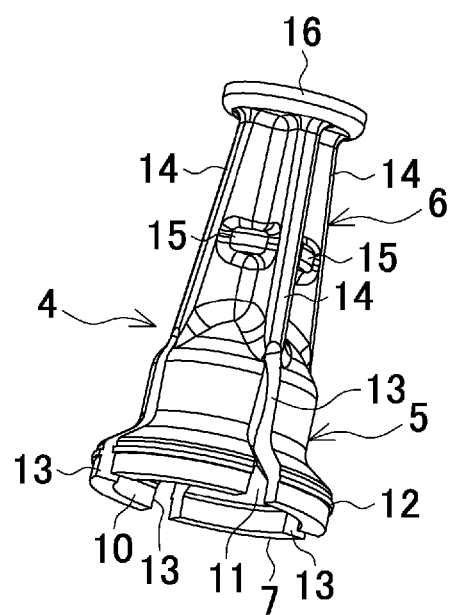
FIG. 2 is an exploded perspective view showing removal of a protrusion on the side of the engine and a grommet for attaching a cover.
Figure 2:
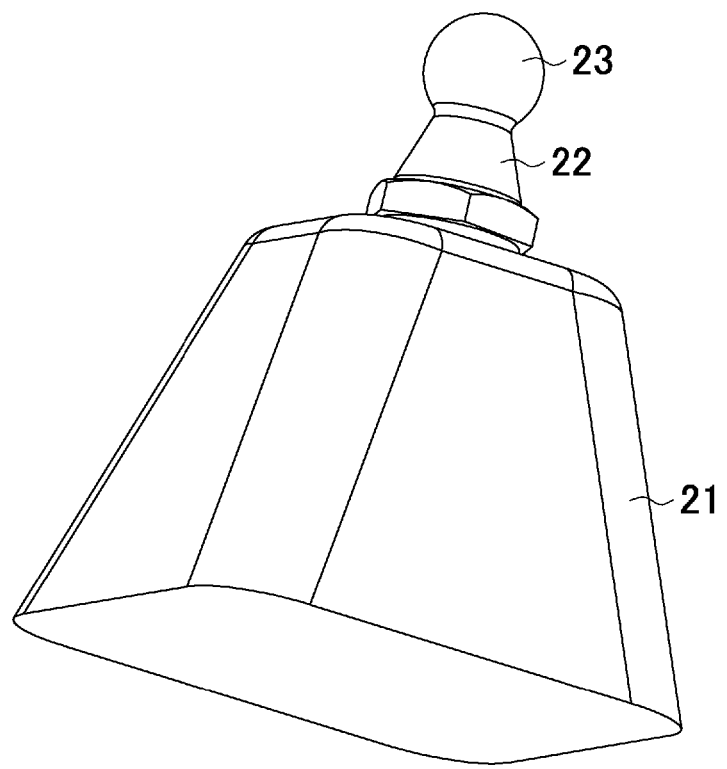

The grommet 4 is formed of a urethane and a integrally foamable thermoplastic resin (for example, PA6, PC/PET, ABS, or the like) having an adhesive property, and as also shown in FIG. 2, has a rod shape with a diameter that is gradually increased from an upper end to a lower end. A concave part 5 into which the tip end portion 23 of the ball stud 22 can be fitted is formed in a lower end of the grommet 4 on an enlarged diameter side, and a pull-out prevention part 6 buried in the attachment part 3 and configured to prevent the attachment part 3 from being pulled out is formed at an upper end on a reduced diameter side.

Figure 3:
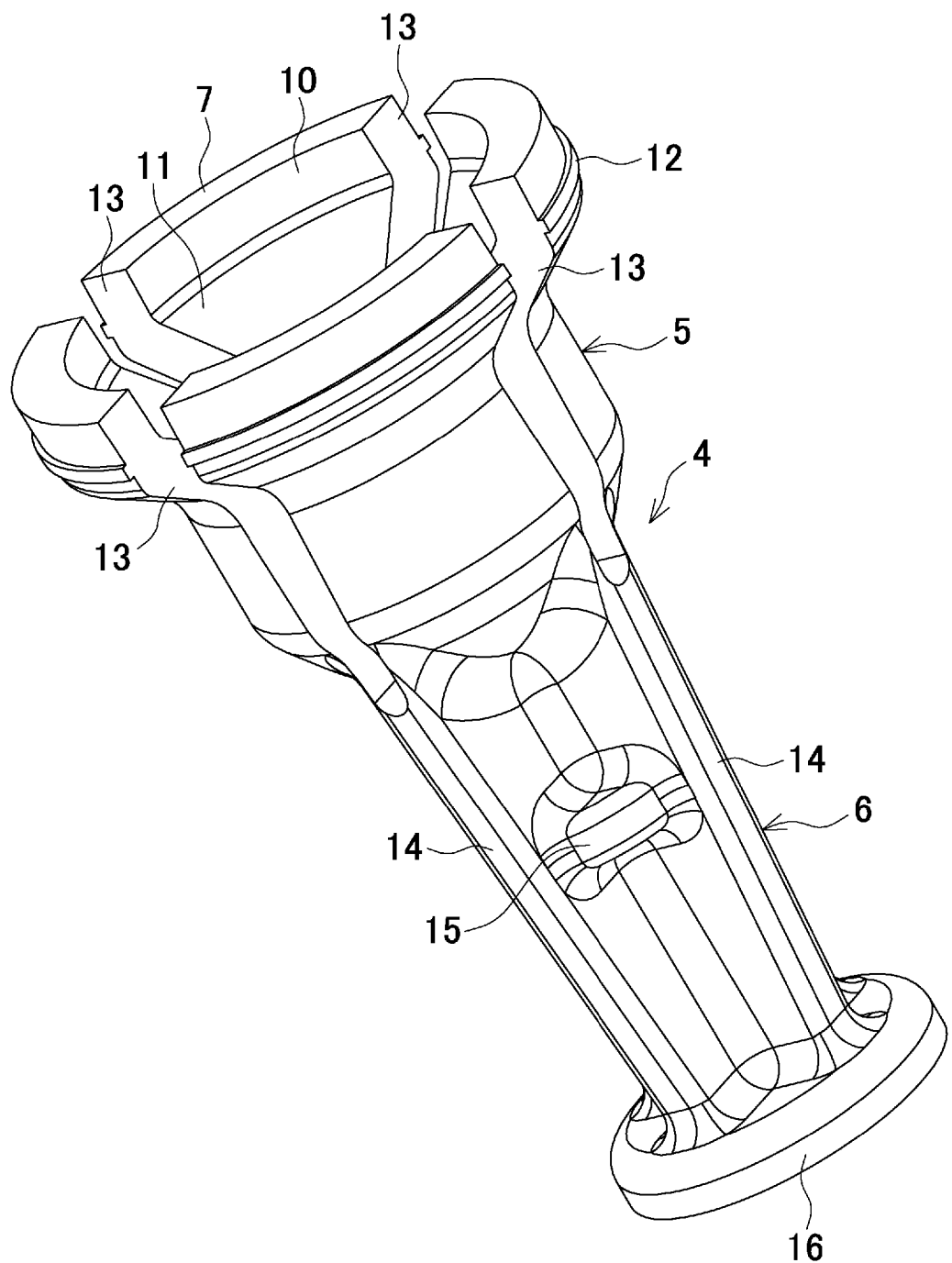
FIG. 3 is a perspective view of the grommet for attaching a cover.
Figure 4:
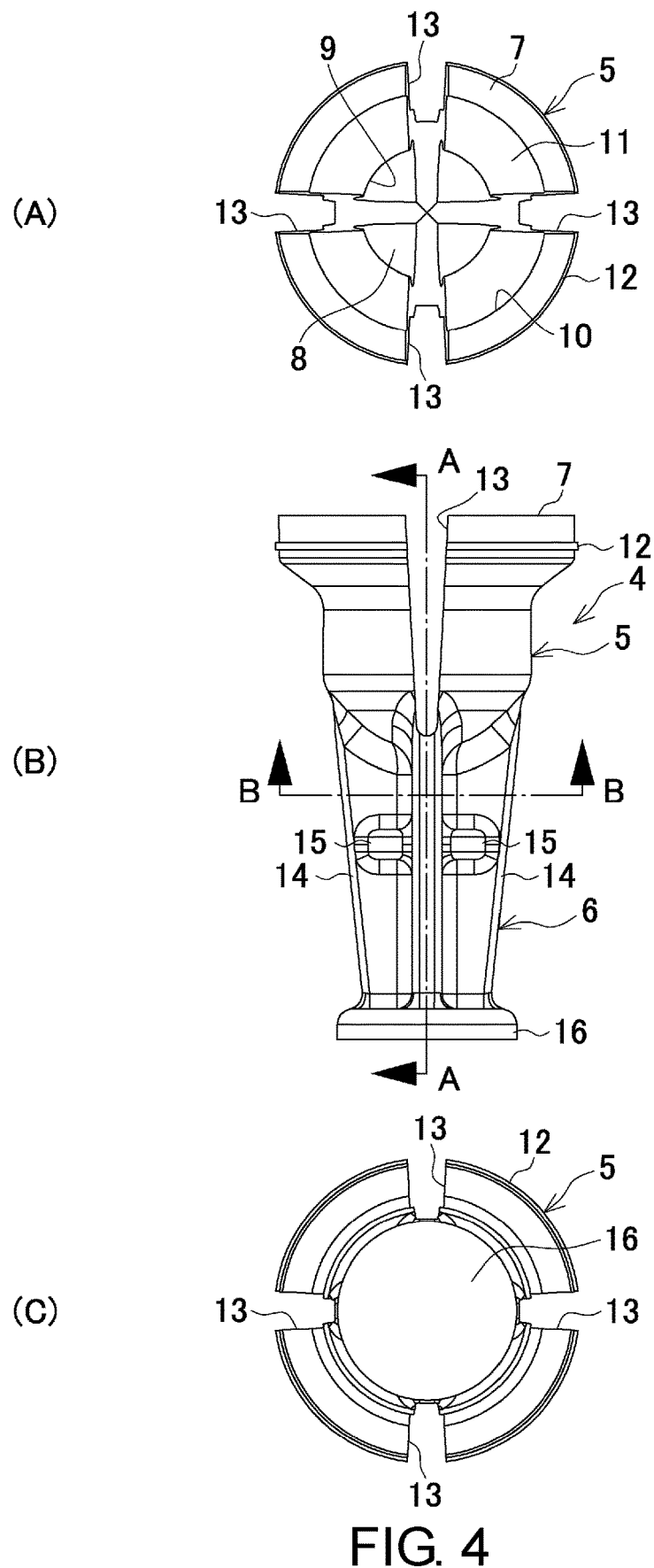
FIG. 4 is a view for describing the grommet for attaching a cover, (A) is a plan view, (B) is a front view, and (C) is a bottom view when an open end side is directed upward.
Figure 5:
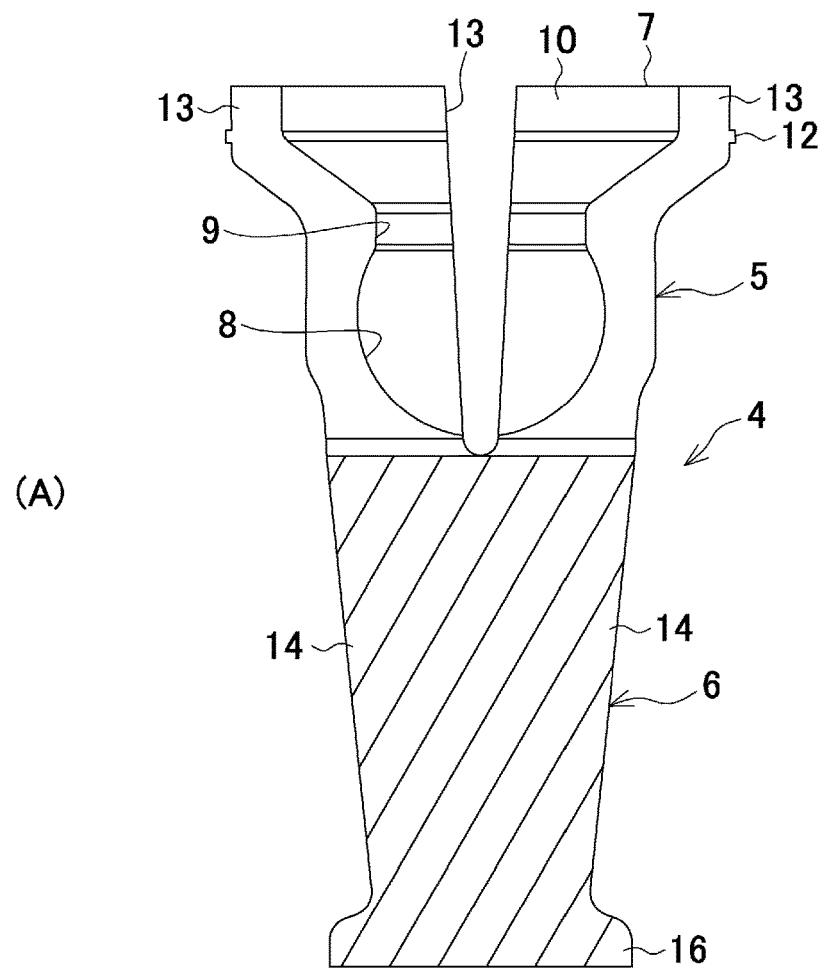
FIG. 5 is an enlarged cross-sectional view of FIG. 4, (A) is taken along line A-A in FIG. 4, and (B) is taken along line B-B in FIG. 4.
Figure 5:
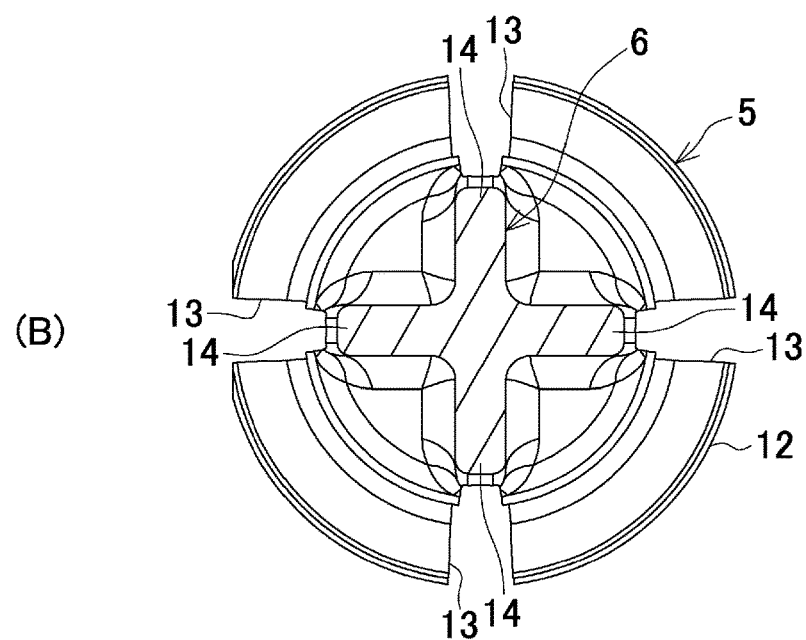

First, as shown in FIGS. 3 to 5, the concave part 5 includes an open end portion 7 that opens with a diameter greater than an outer diameter of the tip end portion 23 of the ball stud 22, and a fitting portion 8 connected to the open end portion 7 and having an inlet 9 with a diameter smaller than the outer diameter of the tip end portion 23 and into which the tip end portion 23 is fitted. An inner surface of the open end portion 7 is constituted by an equal-diameter surface 10 having a diameter greater than the outer diameter of the tip end portion 23 and a tapered surface 11 having a diameter that is gradually reduced from the equal-diameter surface 10 toward the inlet 9. A projection 12 is formed on an outer circumference of the open end portion 7.

Then, as shown in FIGS. 4 and 5, four slits 13, 13 . . . , which are cut from the open end portion 7 in an axial direction to reach the fitting portion 8 are formed in the concave part 5 at equal intervals in a circumferential direction. A width of each of the slits 13 is formed in a tapered shape such that a starting end on the side of the open end portion 7 is widest and a terminal end reaching the fitting portion 8 is narrowest.

Next, the pull-out prevention part 6 is formed in a + shape in a lateral cross section having four first ribs 14, 14 . . . extending radially from an axial center of the grommet 4 in the radial direction, and the first ribs 14 are continuously formed from terminal ends of the slits 13 according to phases of the slits 13 of the concave part 5, and are disposed on extensions of the slits 13 in the axial direction. In addition, four second ribs 15, 15 . . . that connect the first ribs 14 and 14 adjacent to each other in the circumferential direction are formed in the circumferential direction on a substantially intermediate section of the pull-out prevention part 6 in the axial direction.

In addition, each of the first ribs 14 has a protrusion amount that is reduced in the radial direction such that an outer diameter of the pull-out prevention part 6 is gradually reduced toward a side opposite to the concave part 5, and is connected to a circular plate section 16 having a diameter greater than the outer diameter by an outer surface of each of the first ribs 14 in the radial direction at an end portion on the side opposite to the pull-out prevention part 6.

In the grommet 4 and the engine cover 1 configured as described above, the grommet 4 is formed integrally with each of the attachment parts 3 when the engine cover 1 is formed by foaming a urethane. Here, as shown in FIG. 1, the grommet 4 is formed integrally such that the projection 12 of the outer circumference of the concave part 5 is disposed on the protruding surface of the attachment part 3. That is, the open end portion 7 protrudes slightly from the end surface of the attachment part 3. Accordingly, the grommet 4 is integrated with the attachment part 3 in a state in which the grommet 4 is prevented from being removed and rotated by the first ribs 14, the second ribs 15 and the circular plate section 16 by securing elastic deformation of the concave part 5 and burying the entire pull-out prevention part 6 in the attachment part 3.

Figure 6:
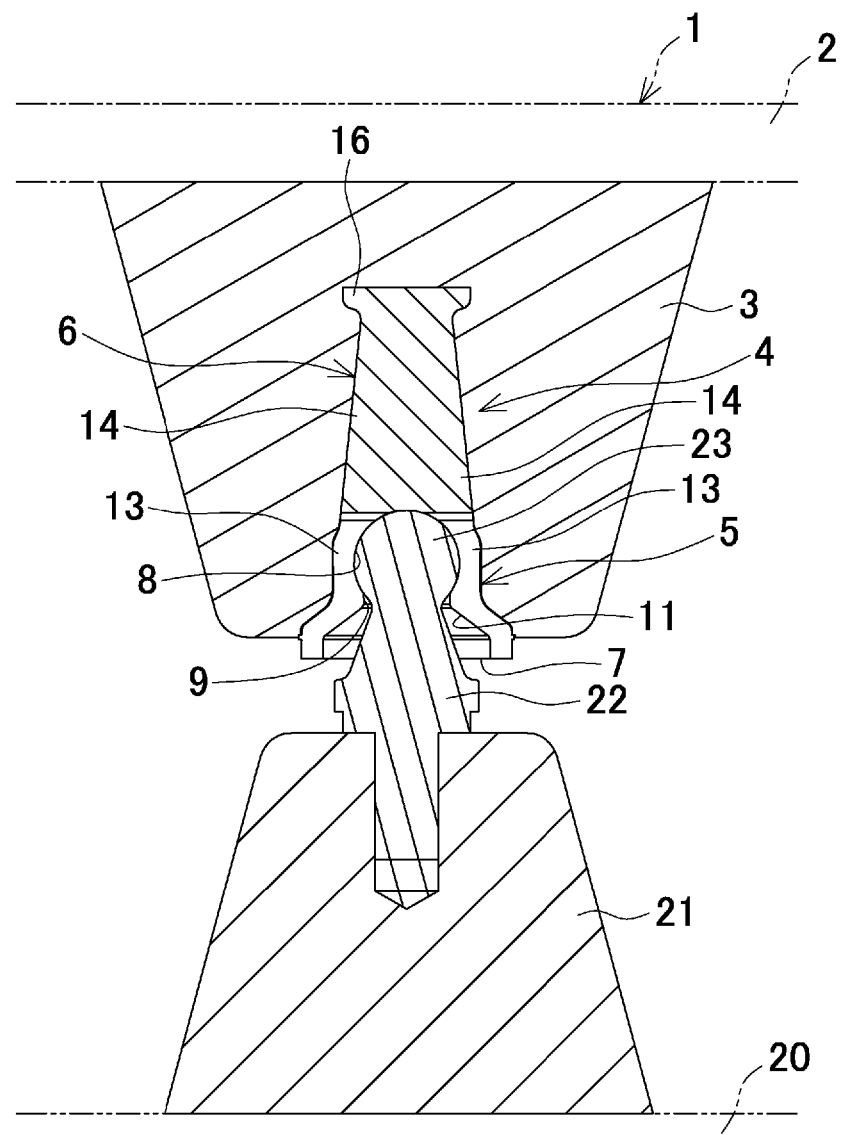
FIG. 6 is a view for describing a state in which the engine cover is mounted on the engine.

In this way, the engine cover 1 that holds the grommet 4 aligns a position of each of the attachment parts 3 with each of the ball studs 22 provided on the engine 20 and pushes each of the attachment parts 3 toward the engine 20. Then, the tip end portion 23 of the ball stud 22 enters the equal-diameter surface 10 from the open end portion 7 of the grommet 4, and is guided to the inlet 9 by the tapered surface 11. Here, since elastic deformation is allowed in the concave part 5 by the slits 13 while the tip end portion 23 abuts the inlet 9, the tip end portion 23 relatively spreads the inlet 9 to enter the fitting portion 8. After that, as shown in FIG. 6, the concave part 5 returns to its original shape and the inlet 9 is locked to a root side of the tip end portion 23 to hold the tip end portion 23. Here, when the inlet 9 passes the tip end portion 23 and returns to its original shape, a good fitting feeling can be obtained. Accordingly, each of the ball studs 22 is connected to one of the grommets 4 and attachment of the engine cover 1 is completed.

Meanwhile, when the engine cover 1 is removed, each of the attachment parts 3 of the engine cover 1 is pulled away from the ball stud 22 and the tip end portion 23 is removed from the grommet 4. Here, since the grommet 4 is integrated with the attachment part 3 also by the second ribs 15 and the circular plate section 16 in addition to the first ribs 14, resistance in a pull-out direction is increased, and it is unlikely that the grommet 4 will come off the attachment part 3 and remain on the ball stud 22.

In this way, according to the grommet 4 and the engine cover 1 of the aspect, the concave part 5 of the grommet 4 includes the open end portion 7 having an inner diameter greater than an outer diameter of the tip end portion 23 of the ball stud 22, the fitting portion 8 connected to the open end portion 7 and having the inlet 9 with a diameter smaller than the outer diameter of the tip end portion 23 and into which the tip end portion 23 is fitted, and the plurality of slits 13 formed in a fitting direction of the ball stud 22 from the open end portion 7 and disposed at a predetermined interval in the circumferential direction of the concave part 5, the pull-out prevention part 6 includes the plurality of first ribs 14 disposed on extension lines of the slits 13, and thus elastic deformation of the concave part 5 due to the slits 13 can be secured and workability for attachment/detachment of the engine cover 1 is improved. In addition, since molding by the resin is also possible, a reduction in weight can be accomplished, a resin having a high adhesive property with respect to the engine cover 1 formed of a urethane can be selected, adhesion processing is not required, and a reduction in cost can also be accomplished.

In particular, here, since the first ribs 14 are formed to be continuous with the slits 13, end portions of the slits 13 are reinforced by the first ribs 14.

In addition, since the second ribs 15 that connect the first ribs 14 and 14 adjacent to each other in the circumferential direction of the pull-out prevention part 6 in the circumferential direction are formed on the pull-out prevention part 6, the pull-out prevention part 6 is reinforced and a resistance in the pull-out direction is also increased.

Further, since the tapered surface 11 having an inner diameter that is gradually reduced toward the inlet 9 of the fitting portion 8 is formed on the inner surface of the open end portion 7, the tip end portion 23 of the ball stud 22 is smoothly guided to the inlet 9, and workability related to mounting of the engine cover 1 is further improved.

Meanwhile, since the concave part 5 and the pull-out prevention part 6 are formed of a thermoplastic resin, a high adhesive property can be obtained even in the engine cover 1 formed of the urethane.

In addition, since the four slits 13 are set and have a width that is gradually reduced from the open end portion 7 toward the fitting portion 8, large elastic deformation can be secured on the side of the open end portion 7.

Further, since the engine cover 1 is formed of the urethane, it leads to a further reduction in weight.

Further, while the first rib is formed to be continuous with the slit in this aspect, the first rib may be formed discontinuously with the slit. In this case, the slit can be formed short and the strength of the concave part can be maintained.

In addition, the slit is not limited by the fitting portion and may be lengthily extended to the pull-out prevention part. In this case, the slit can be lengthily formed to largely elastically deform the concave part.

Further, the structure of the concave part is likewise not limited to the aspect, and it is also possible for the tapered surface of the open end portion to be omitted or the number of slits to be increased or decreased. The diameter of the inlet of the concave part may be made equal to the outer diameter of the tip end portion of the ball stud. Also, in the pull-out prevention part, the second ribs may be omitted, or on the other hand, the plurality of second ribs may be formed at predetermined intervals in the axial direction.

Then, the grommet of the present disclosure can also be employed in the attachment pin instead of the ball stud having the tip end portion that is spherical. In this case, the shape of the concave part may be a square tube or the like according to the tip end portion of the attachment pin.

In addition, the present disclosure is not limited to the engine of the automobile as the body to be covered and is applicable to another mechanical device such as a compressor, a speed reducer, a pump, a motor, or the like, as long as the present disclosure is a cover provided for the purpose of soundproofing.

Other Configurations

According to one embodiment of the disclosure, provided is a grommet for attaching a cover formed integrally with an attachment part protruding from a back surface of a cover main body and to which a tip end portion of an attachment pin provided on a body to be covered is fitted, the grommet for attaching a cover including: a concave part into which the tip end portion is fitted, and a pull-out prevention part buried in the attachment part and configured to prevent pulling out from the attachment part, wherein the concave part includes an open end portion having an inner diameter that is greater than an outer diameter of the tip end portion, a fitting portion connected to the open end portion and having an inlet with a diameter equal to or smaller than the outer diameter of the tip end portion and into which the tip end portion is fitted, and a plurality of slits formed in a fitting direction of the attachment pin from the open end portion and disposed at predetermined interval in a circumferential direction of the concave part, and the pull-out prevention part includes a plurality of first ribs disposed on extension lines of the slits.

According to one embodiment of the disclosure, the first rib is formed discontinuously with the slit.

According to one embodiment of the disclosure, the first rib is formed continuously with the slit.

According to one embodiment of the disclosure, the slit extends to the pull-out prevention part.

According to one embodiment of the disclosure, second ribs that connect the first ribs adjacent to each other in a circumferential direction of the pull-out prevention part in the circumferential direction are formed on the pull-out prevention part.

According to one embodiment of the disclosure, a tapered surface having an inner diameter that is gradually reduced toward the inlet of the fitting portion is formed on the inner surface of the open end portion.

According to one embodiment of the disclosure, the concave part and the pull-out prevention part are formed of a thermoplastic resin.

According to one embodiment of the disclosure, the slits are four, and have a width that is gradually reduced from the open end portion toward the fitting portion.

According to one embodiment of the disclosure, the cover is formed of a urethane.

According to another embodiment of the disclosure, provided is a cover including a cover main body, and a plurality of attachment parts protruding from a back surface of the cover main body to correspond to attachment pins provided on a body to be covered, wherein the grommet for attaching a cover of the above embodiments is formed integrally with each of the attachment parts.

According to one embodiment of the disclosure, the concave part of the grommet for attaching a cover includes the open end portion having an inner diameter that is greater than an outer diameter of the tip end portion of the attachment pin, the fitting portion connected to the open end portion and having an inlet with a diameter equal to or smaller than the outer diameter of the tip end portion and into which the tip end portion is fitted, and the plurality of slits formed in a fitting direction of the attachment pin from the open end portion and disposed at predetermined interval in a circumferential direction of the concave part, the pull-out prevention part includes the plurality of first ribs disposed on extension lines of the slits, and thus, elastic deformation of the concave part due to the slit can be secured, and workability for attachment/detachment of the cover is improved. In addition, since formation by the resin is also possible, a reduction in weight can be accomplished, the resin having a high adhesive property with respect to the cover formed of a urethane can be selected, and adhesion processing is not required and a reduction in cost can be accomplished.

According to one embodiment of the disclosure, since the first rib is formed discontinuously with the slit, the slit can be formed shortly, and strength of the concave part can be maintained.

According to one embodiment of the disclosure, since the first rib is formed continuously with the slit, the end portion of the slit is reinforced by the first rib.

According to one embodiment of the disclosure, since the slit extends to the pull-out prevention part, the slit can be more lengthily formed to largely elastically deform the concave part.

According to one embodiment of the disclosure, since the second ribs that connect the first ribs adjacent to each other in a circumferential direction of the pull-out prevention part in the circumferential direction are formed on the pull-out prevention part, the pull-out prevention part is reinforced, and a resistance in a pull-out direction is also increased.

According to one embodiment of the disclosure, since the tapered surface having an inner diameter that is gradually reduced toward the inlet of the fitting portion is formed on the inner surface of the open end portion, the tip end portion of the attachment pin is smoothly guided to the inlet, and workability related to mounting of the cover is further improved.

According to one embodiment of the disclosure, since the concave part and the pull-out prevention part are formed of a thermoplastic resin, a high adhesive property is obtained even in the cover formed of the urethane.

According to one embodiment of the disclosure, since the slits are four, and have a width that is gradually reduced from the open end portion toward the fitting portion, large elastic deformation can be secured on the side of the open end portion.

According to one embodiment of the disclosure, since the cover is formed of the urethane, it leads to a further reduction in weight.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A grommet for attaching a cover formed integrally with an attachment part protruding from a back surface of a cover main body and to which a tip end portion of an attachment pin provided on a body to be covered is fitted, the grommet comprising: a concave part into which the tip end portion is fitted, and a pull-out prevention part buried in the attachment part and configured to prevent pulling out from the attachment part, wherein the concave part comprises an open end portion having an inner diameter that is greater than an outer diameter of the tip end portion, a fitting portion connected to the open end portion and having an inlet with a diameter equal to or smaller than the outer diameter of the tip end portion and into which the tip end portion is fitted, and a plurality of slits formed in a fitting direction of the attachment pin from the open end portion and disposed at a predetermined interval in a circumferential direction of the concave part, wherein the pull-out prevention part is spaced from the concave part along the fitting direction, wherein the pull-out prevention part comprises a plurality of first ribs that are adjacent to each other in the circumferential direction of the pull-out prevention part and disposed on extension lines of the slits, wherein the plurality of first ribs has a protrusion amount that is reduced in the radial direction such that an outer diameter of the pull out prevention part is gradually reduced toward a side opposite to the concave part; and wherein second ribs are formed in the pull-out prevention part, the second ribs connecting the first ribs in the circumferential direction.

2. The grommet for attaching the cover according to claim 1, wherein each of the first ribs is formed discontinuously with the slit.

3. The grommet for attaching the cover according to claim 1, wherein each of the first ribs is formed continuously with the slit.

4. The grommet for attaching the cover according to claim 1, wherein the slit extends to the pull-out prevention part.

5. The grommet for attaching the cover according to claim 1, wherein a tapered surface having an inner diameter that is gradually reduced toward the inlet of the fitting portion is formed on an inner surface of the open end portion.

6. The grommet for attaching the cover according to claim 1, wherein the concave part and the pull-out prevention part are formed of a thermoplastic resin.

7. The grommet for attaching the cover according to claim 1, wherein a number of the slits is four, and a width of each of the slits is gradually reduced from the open end portion toward the fitting portion.

8. The grommet for attaching the cover according to claim 1, wherein the cover is formed of urethane.

9. A cover, comprising:
a cover main body; and
a plurality of attachment parts protruding from a back surface of the cover main body to correspond to attachment pins provided on a body to be covered,
wherein the grommet for attaching the cover according to claim 1 is formed integrally with each of the attachment parts.

* * * * *